UNITED STATES PATENT OFFICE.

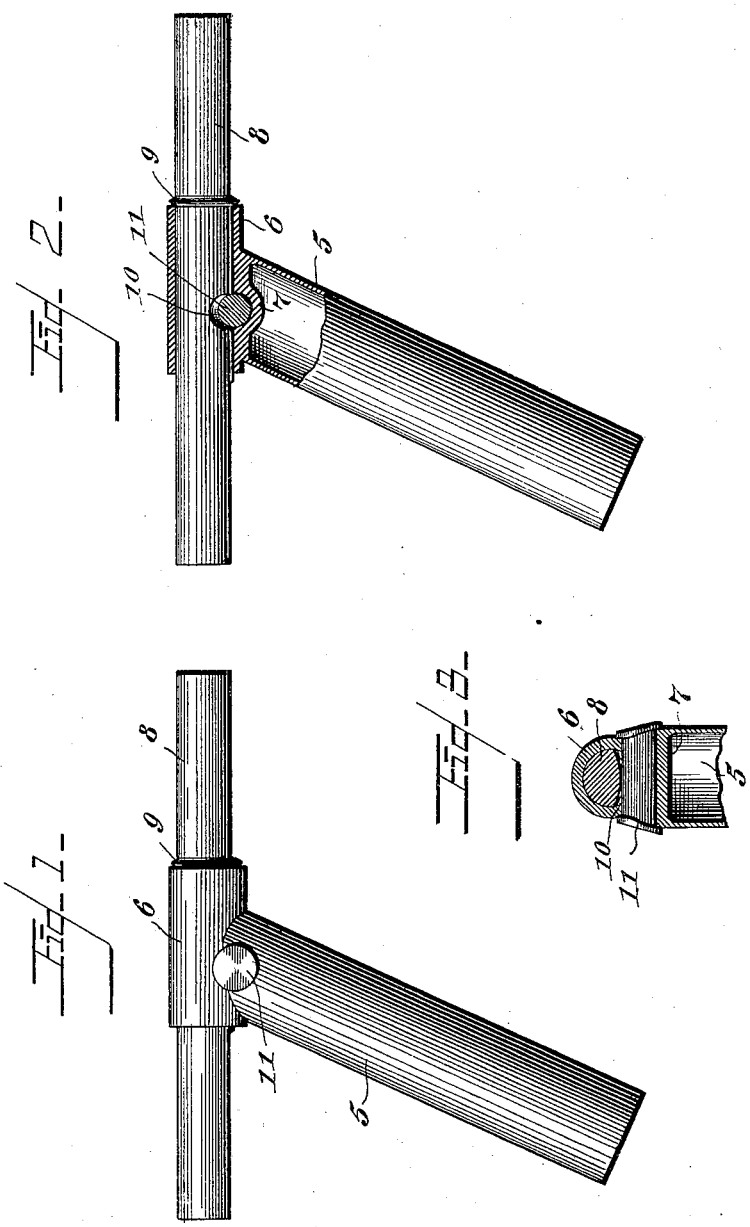

ALBERT WOLFORD NUTZ, OF PLAINVILLE, KANSAS.

BICYCLE SEAT-POST.

SPECIFICATION forming part of Letters Patent No. 651,264, dated June 5, 1900.

Application filed September 12, 1899. Serial No. 730,262. (No model.)

*To all whom it may concern:*

Be it known that I, ALBERT WOLFORD NUTZ, a citizen of the United States, residing at Plainville, in the county of Rooks and State of Kansas, have invented a new and useful Bicycle Seat-Post, of which the following is a specification.

This invention relates to bicycle seat-posts, and more particularly to the seat-supporting T therefor; and it has for its object to provide a construction in which the bar of the T will be loosely mounted in the head to permit a rocking motion of the bar and a corresponding movement of the seat, with a consequent ease to the rider.

In the drawings forming a portion of this specification, and in which like numerals of reference indicate similar parts in the several views, Figure 1 is a side elevation showing the T with its head in position. Fig. 2 is a view similar to Fig. 1 with a portion broken away to show the location and arrangement of the seat-supporting bar. Fig. 3 is a section taken through the head and seat-supporting bar and also through a portion of the stem, the securing-rivet being shown in elevation.

Referring now to the drawings, 5 represents the stem of the seat-supporting T, having a tubular head 6 extending at opposite sides of the stem and at an acute angle to the axis of the latter. Transversely of the stem and head is formed a perforation opening into the inclosure of the head, the lower wall of said perforation being extended into the stem of the T, as shown in Fig. 2, a line drawn longitudinally of the lowermost point of the inner wall of the head passing through the center of this perforation.

A seat-supporting bar 8 is adapted for insertion in the head 6 and to fit snugly therein and is provided with an annular flange 9, adapted to lie against the rear end of the head and to act as a stop in the insertion of a bar.

A transverse groove 10 is formed in one side of the bar 8, at right angles to the axis of the latter, and is arc-shaped in cross-section, the outline of this slot in a plane at right angles to the axis of the bar 8 and passing centrally of the slot being an arc having a radius greater than that of the bar, as shown in Fig. 3 of the drawings. Passed through the perforation in the head and stem and lying in the groove 10 is a rivet 11, the ends of which extend outwardly beyond the surfaces of the head and stem and are upset or otherwise treated to prevent displacement. With this construction, as will be readily understood, the bar 8 may have a rocking or oscillatory movement in the head, which movement will be limited, and at the same time longitudinal displacement of the bar will be prevented. Correspondingly a seat upon the bar 8 will yield to the action of the rider and will have an oscillatory movement, contributing great ease in the operation of the bicycle to which this construction is applied.

It will of course be understood that in practice the specific structure shown may be altered and that any suitable materials and proportions may be employed without departing from the spirit of the invention.

It will be seen from reference to Fig. 2 of the drawings that the annular flange 9 upon the bar 8 limits the movement of the bar when it is inserted to that point where its transverse slot will register with the perforation to permit the ready insertion of the rivet.

Having thus described the invention, what I claim is—

1. In a seat-support, the combination with a stem having a tubular head provided with a perforation, of a seat-supporting bar within the head and having a transverse slot passing part way around the bar, a rivet lying in the perforation and slot, transversely of the bar, to permit limited rocking movement of the bar, and a flange upon the bar adapted to engage the head to aline the perforation and slot.

2. In a seat-support, the combination with a stem and a tubular head, having a perforation therein, of a seat-bar in the head, a slot in the bar, and a rivet lying in the perforation and slot transversely of the bar to permit a limited rocking movement of the bar and prevent longitudinal displacement thereof.

In testimony that I claim the foregoing as my own I have hereto affixed my signature in the presence of two witnesses.

ALBERT WOLFORD NUTZ.

Witnesses:
THOS. J. GLENNON,
JAMES DOUGHERTY.